INVENTORS
MARK HASTEN
LEE S. JONES
JOHN T. HAUB
GERALD E. CEROLL
BY
ATTORNEY

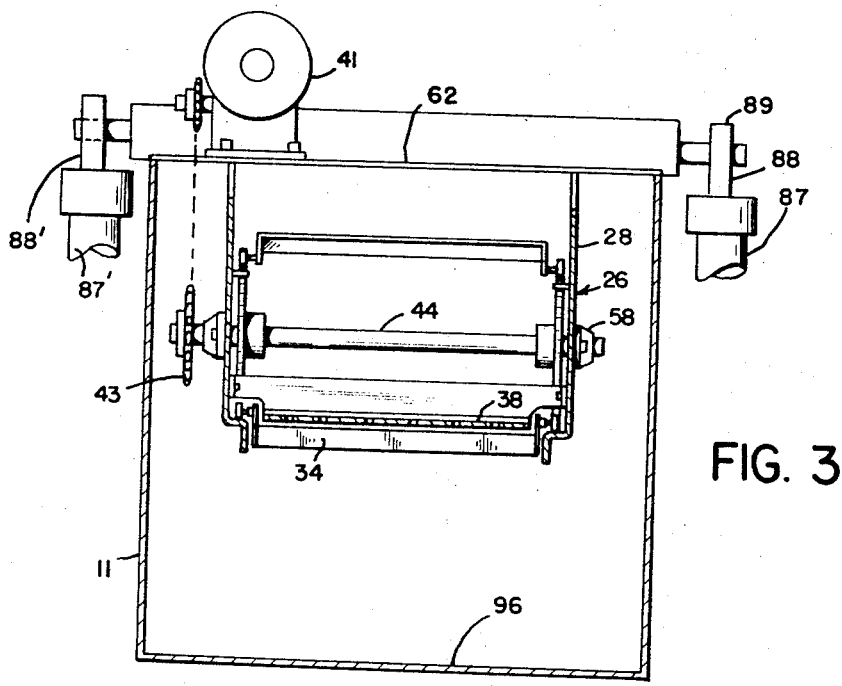
FIG. 3
FIG. 4
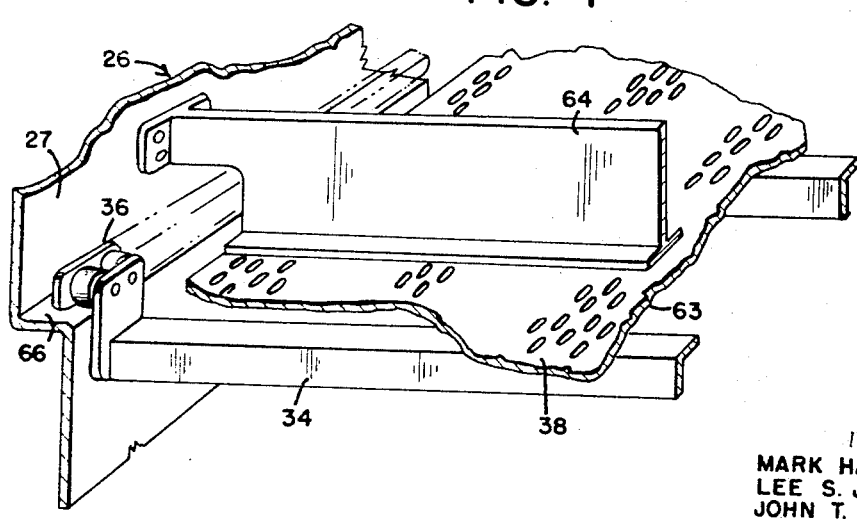
INVENTORS
MARK HASTEN
LEE S. JONES
JOHN T. HAUB
BY GERALD E. CEROLL
ATTORNEY

United States Patent Office 3,446,138
Patented May 27, 1969

3,446,138
CONTINUOUS DEEP FAT FRYER
Mark Hasten, Lee S. Jones, John T. Haub, and Gerald E. Ceroll, Minneapolis, Minn., assignors to General Mills, Inc., a corporation of Delaware
Filed Oct. 13, 1967, Ser. No. 675,124
Int. Cl. A47j 37/12
U.S. Cl. 99—404         10 Claims

ABSTRACT OF THE DISCLOSURE

A continuous deep fat fryer having a conveyor for moving food products through an oil bath to a discharge conveyor. A plate cooperates with the conveyor to submerge the food product in the frying oil which is directed into a fryer tank at one end of the tank. Baffles are provided at the input to eliminate eddy currents in the oil flow.

Background of the invention

This invention relates to deep fat fryers and more particularly to continuous deep fat fryers designed to uniformly cook a food product while maintaining the food product completely submerged in cooking oil.

For years the food industry has used deep fat fryers of one type or another. One type of such fryers is a batch fryer where a wire basket or similar device is loaded with a batch of food product such as potato slices which are submerged in a container of hot cooking oil. The basket is submerged until the food product is cooked after which the product is removed from the oil as a fried potato chip. The batch of cooked product is then emptied and the basket is reloaded for a repetition of the cooking step. Obviously this type of system is inefficient because of its batch limitations in the production of large quantities of product of uniform quality.

Other systems which are continuous in operation have been used which include apparatus for introducing the product into one end of a tank filled with cooking oil. Other apparatus is used to convey the product through the oil to a discharge end. Trouble is encountered in this type of fryer because many types of food products have a tendency to float after they have been cooked to a certain degree and these floating particles of product tend to be captured by eddy currents in the continuously flowing cooking oil. The stray bits of food product become overcooked and thereby contaminate the cooking oil to produce a low quality undesirable food product.

Further, these continuous machines characteristically have difficulty maintaining all of the food product submerged in the cooking oil during the entire cooking cycle. As noted when products such as sliced potatoes or cereals become partially cooked, they tend to float. This results in part of the product which is floating on top of the oil being uncooked, and much of the product which is completely submerged being overcooked if some type of average product is to be achieved.

Therefore, it is an object of this invention to provide an apparatus for continuously cooking food products to a uniform quality by maintaining the product submerged in the cooking oil.

It is another object of the present invention to provide an apparatus which provides a uniform quality of food product by maintaining control of the oil flow in the fryer tank thereby eliminating overcooked food products in the cooking oil.

It is a further object of the present invention to provide a new and improved deep fat fryer which continuously cooks food products in a submerged condition and which maintains control of the oil flow through the fire tank to eliminate undesirable overcooked product.

Summary

A deep fat fryer apparatus in accordance with the present invention is a continuous fryer which utilizes an endless conveyor in cooperation with a plate to hold the food product below the surface of the cooking oil during the cooking cycle. Hot cooking oil is introduced into the input end of the fryer tank to eliminate eddy currents formed in such oil movement under normal conditions and thereby eliminating overcooked bits of food product which tend to contaminate the product. The entire conveyor and hold down apparatus are easily removable from the fryer tank by mechanical means to permit easy access to the fryer tank, to permit inexpensive maintenance of the moving equipment and to insure high quality conditions for production of food product in the deep fat fryer.

Brief description of the drawings

FIGURE 3 is a cross sectional view of the fryer taken along line 3—3 of FIGURE 1 of the drawings,
FIGURE 4 is a fractional isometric view showing a section of the conveyor and the plate illustrated in FIGURE 2.

Description of the preferred embodiments

Figure 1:
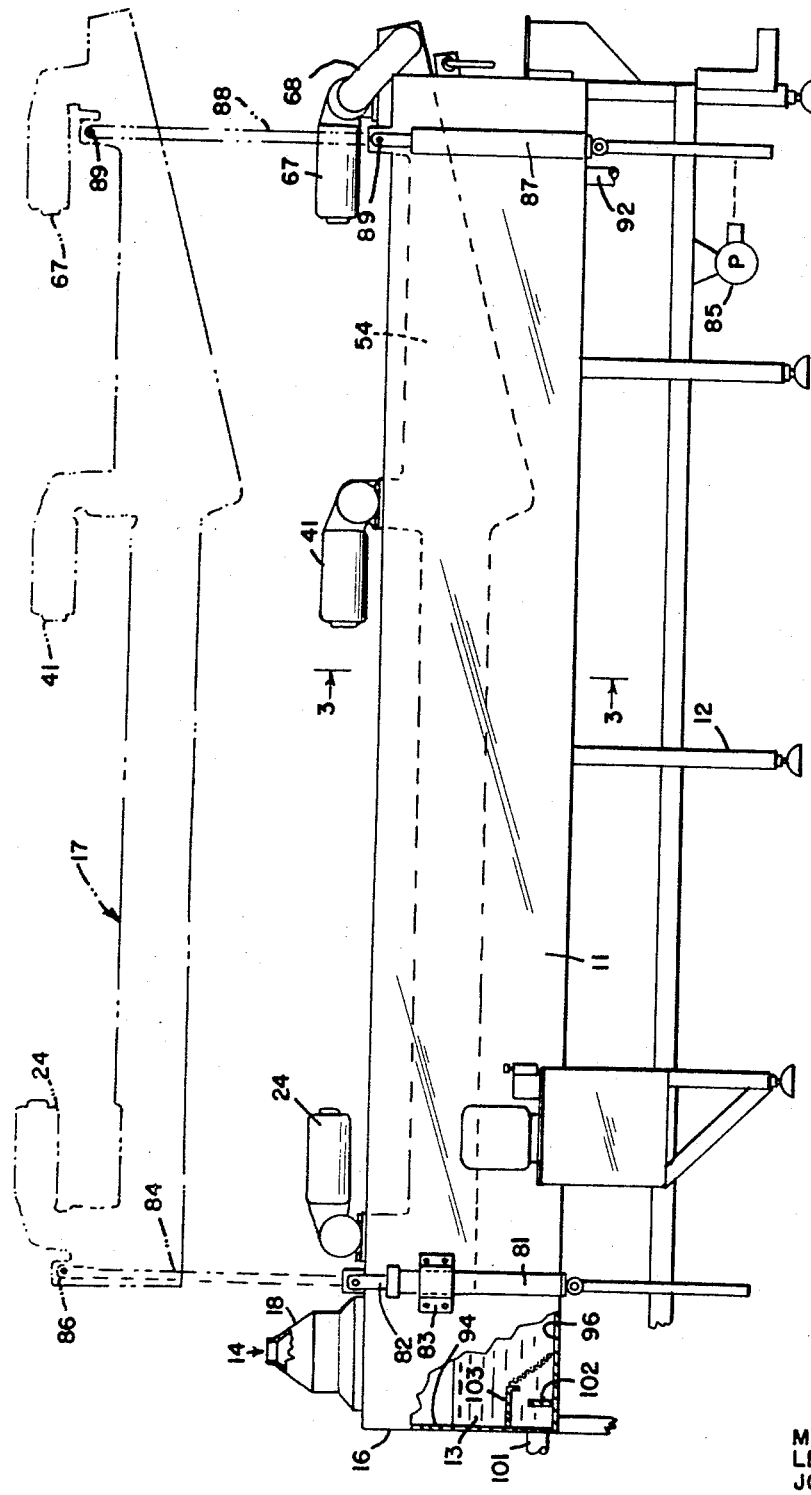
FIGURE 1 is a front view of a deep fat fryer in accordance with the invention.

Refer first to FIGURE 1 of the drawings. A tank 11 is mounted on a chassis 12, This frying tank 11 is an elongated tank which contains sufficient frying oil to cook a food product which is introduced into the input 14 of head 18 of the tank mounted at the input end 16. The tank 11 is generally rectangular in cross section. The front view illustrated in FIGURE 1 indicates that it is substantially longer than it is wide so that the tank can accommodate a conveyor assembly 17. A cross sectional view of the tank 11 illustrated in FIGURE 3 of the drawings shows that the tank is also rectangular in cross section.

A food product such as potato slices or chips or pieces of cereal dough or combinations thereof, may be introduced into the tank 11 at input end 16 through a hood 18 or the product may simply be dropped into the frying oil 13. Conveyor assembly illustrated in FIGURES 2, 3, and 4 then moves the product through the tank 11 at a predetermined rate to insure a uniformly cooked product.

Figure 2:
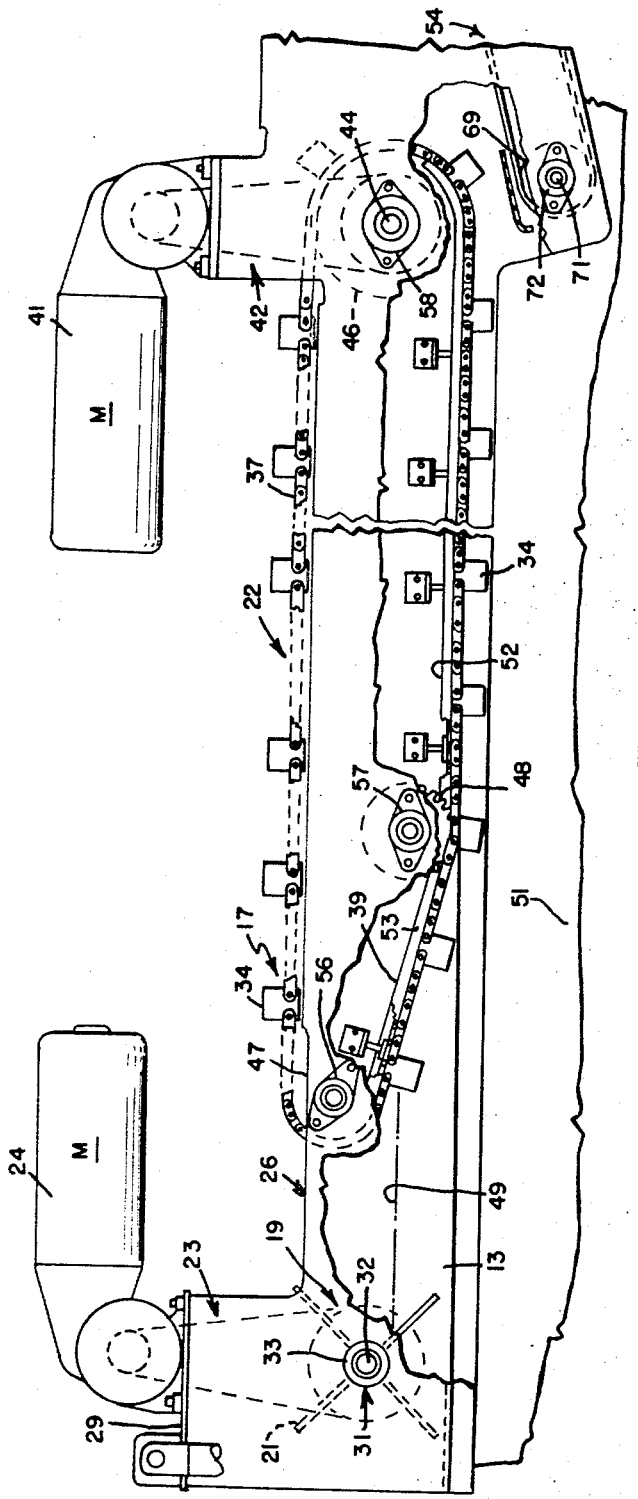
FIGURE 2 is a front view partially in cross section of a conveyor assembly illustrating an endless conveyor and plate.

Refer to FIGURE 2 of the drawings. The conveyor assembly 17 contains a paddle assembly 19 which is located near the input end 16 of the tank 11. A paddle 21 rotates in the counterclockwise direction as viewed in FIGURE 2 to move the product introduced into the tank 11 toward endless conveyor 22. The paddles 21 are partially submerged in the frying oil 13 and push the product towards the conveyor 22. The paddles 21 are driven by a chain and sprocket mechanism 23. Motor 24 provides the motive force for this chain and sprocket assembly 23. The motor and sprocket chain assembly are conventional apparatus available commercially and are well understood in the art. The entire paddle assembly 19 including the sprocket and the motor 24 are connected to a conveyor frame 26. This conveyor frame contains side walls 27 and 28, see FIGURE 3 of the drawings. The motor 24 is bolted to a cross member 29 which interconnects walls 27 and 28 of the frame 26. This cross member 29 forms a platform for the sprocket assembly as well as a platform for the motor 24 for attachment to the conveyor frame 26. The paddle 21 is connected to the conveyor 26 by a shaft assembly 31. This shaft assembly can be seen in FIGURE 2. The shaft assembly includes a shaft 32 on which the paddles 21 are mounted. The shaft 32 is connected to the walls 27 and 28 by bearing housings 33. These bearing housings 33 are attached to the side walls 27 and 28 respectively.

The paddle 21 pushes the food product through the frying oil 13 toward the conveyor 22 where push bars 34, which interconnect conveyor chains 36 and 37, engage the product and force the product below plate 38. The endless conveyor 22 is operated by a motor and sprocket arrangement similar to that used in connection with operation of paddle 21. A motor 41 drives a sprocket and chain assembly 42 which drives a conveyor sprocket 43. This conveyor sprocket 43 is connected to a shaft 44 to which conveyor drive wheels 46 are connected. These drive wheels move the chains 36 and 37 of conveyor 22 in the counter-clockwise direction as viewed in FIGURE 2 of the drawings. The top surface of the continuous conveyor 22 moves horizontal to the tank and passes over a chain sprocket 47. The chain sprocket 47 is smaller than chain sprocket 46 so that a portion of the conveyor from chain sprocket 47 to guide sprocket 48 forms an angle with respect to the top surface 49 of the oil. Food product which is moving toward the continuous conveyor 22 is engaged by push bars which are entering the frying oil near the input end of the tank 11. These push bars 34 engage the product and move the product below the plate 38 which follows the contour of the lower moving surface of endless conveyor 22.

The plate 38 is mounted between the operating surfaces of the continuous or endless conveyor 22. It is located nearest the operating surface of the conveyor 22 which is closest to the bottom 51 of the tank 11. This will be observed most readily in FIGURE 2 of the drawings where plate 38 is shown to have a first portion 52 parallel to the bottom of tank 11 and a second portion 53 which angles upwardly from the guide sprocket 48 so that it emerges above the surface 49 of the cooking oil and terminates above the surface. Therefore a product which is engaged by the push bars 34 will be forced below the perforated plate 38 and will be continued to be forced deeper into the hot frying oil until the bottom conveying surface of the continuous conveyor becomes parallel with the bottom 51 of the tank 11 as the chains pass guide sprocket 48. The food product is held under the plate 38 and moved along the length of the plate 38. Plate 38 terminates just short of chain sprocket 46 at which point a discharge conveyor 54 emerges from the hot oil to convey the cooked product from the hot oil to the discharge point illustrated in FIGURE 1 of the drawings.

The conveyor 22, motor 41, and the sprocket assembly 42 are all mounted permanently to the side walls 27 and 28 of conveyor frame 26. The conveyor is mounted to the side walls by conventional bearing housings 56, 57, and 58. An example of this type of mounting is illustrated in FIGURE 3 of the drawings where the shaft 44, housing 58 and sprocket 43 are illustrated. It will be noted that the housing 58 is bolted to the side wall 28 and a shaft 44 operates in the bearing housing 58. The other end of shaft 44 is mounted in exactly the same manner and extends through the bearing housing 61 to extend beyond the housing so that a sprocket 43 may be connected to the shaft 44 for driving the conveyor chains. A cross member 62 which interconnects walls 27 and 28 of the conveyor frame is used for mounting the motor 41 by conventional methods. This cross member 62 together with other similar cross members also provides the conveyor 26 with lateral strength.

An enlarged view of the relationship between the chain 36, push bar 34 and the plate 38 is illustrated in FIGURE 4 of the drawings. Here it will be observed that the plate 38 is suspended immediately above the lower operating surfaces of the continuous conveyor 22. This lower operating surface in the preferred embodiment involves the chain 36 (chain 37 not shown, shown in FIGURE 4) and the push bars 34. The push bars 34 move just below the bottom surface 63 of the plate 38 to carry the food product along the length of the plate 38. A brace 64 interconnects wall 27 and wall 28 (shown in FIGURE 4) of conveyor frame 26. Plate 38 is riveted or welded to the brace member 64. Chain 36, and also 37 on the opposite end of push bars 34 ride along a shelf 66 in the respective walls of the conveyor frame 26.

The continuous conveyor 22 moves the product through the frying oil to the discharge conveyor 54, the left end of which is submerged in the frying oil and the right end of which, as illustrated in FIGURES 1 and 2 of the drawings, emerges from the tank 11 to discharge the product from the tank 11. Discharge conveyor 54 is a conventional conveyor operated by a motor 67 and a sprocket and chain assembly 68. The sprocket and chain assembly 68 drives the conveyor 54 in a manner set forth in connection with the conveyor 22. Likewise, the conveyor 54 is mounted in the conveyor frame 26 in exactly the same manner as the conveyor 22. The conveyor pulley 69 is mounted on a shaft 71 which in turn is mounted in bearing housings 72. These bearing housings 72 are mounted in the walls 27 and 28 of the conveyor frame. Also, the motor 67, and the sprocket and chain assembly 68 are mounted to the conveyor frame 26.

The entire conveyor frame 26 and all of the attached apparatus is mounted on a hydraulic lift mechanism so that the frame and all the associated gear may be removed from the tank 11 very quickly. Refer now to FIGURE 1 of the drawings again where the conveyor assembly 17 which includes the conveyor 22, the discharge conveyor 54 and the paddle assembly 19 are illustrated in dotted lines. On each side of tank 11 and on each end thereof, are hydraulic pistons like piston 81 illustrated in FIGURE 1. Hydraulic piston 81 is connected to the wall 82 of tank 11 by a bracket 83. The piston rod 84 is connected at its extreme end to the conveyor frame 26 by a bracket 86. The piston is mounted so that the rod 84 moves vertically as illustrated in FIGURE 1 of the drawings. Hydraulic piston 87 operates in exactly the same fashion as hydraulic piston 81 and the rod 88 thereof is likewise connected to the frame 26 but at the discharge end thereof. This connection will be observed at point 89. Pistons, corresponding with pistons 81 and 87 respectively are likewise connected on the other side of tank 11 to the corresponding side of frame 26. When the hydraulic pistons are operated by an appropriate hydraulic system as schematically illustrated in FIGURE 1 by pump 85, the rods will move vertically upward carrying the entire conveyor assembly 17 out of tank 11 to a position above the tank. This permits the entire conveyor assembly to be removed for maintenance, repair, and for easy access to the tank 11 to permit cleaning inspection, and the like. The piston and rod assembly is also illustrated in FIGURE 3 of the drawings where it is noted that the piston 87 with the associated piston rod 88 is movable in the vertical direction to move the frame 26 out of the tank 11. It is noted that rods 88″ and 88 are connected to a cross member 62 which in turn is rigidly connected to frame 26 to carry the frame upwardly out of the tank 11.

Figure 7:
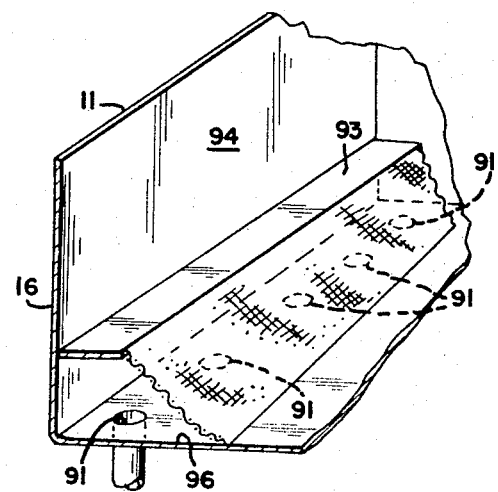
FIGURE 7 is a fractional isometric view of an alternate embodiment of FIGURE 5.
Figure 8:
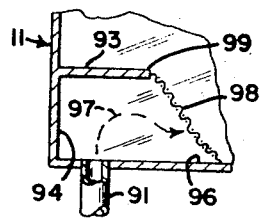
FIGURE 8 is an end view of the mechanism illustrated in FIGURE 7 and showing the oil flow of the mechanism illustrated in FIGURE 7.

In the usual continuous deep fat fryer, the oil is introduced in a variety of locations. The flow of oil into the tank frequently is at rather high volume and therefore tends to create eddy currents in the tank. These eddy currents tend to entrap bits and pieces of food product. These entrapped bits of food product tend to become overcooked and even are burned by the long residence in the cooking oil with the result that the oil is contaminated by these overcooked products. Reference to FIGURES 7 and 8 of the drawings will reveal apparatus for introducing the cooking oil into the tank 11 to reduce the number and intensity of the eddy currents developed and to insure a uniform flow of oil from the input end 16 of the tank to the output end thereof.

The frying oil is introduced through conduit 91 in a direction perpendicular to the ultimate flow of the oil. A number of conduits 91 are mounted across the entire end 16 of the tank 11 to form a manifold type apparatus for introducing the oil along the entire end of the tank 11 as illustrated in FIGURE 7 of the drawings. This insures that the hot frying oil entering the tank through conduits 91 will tend to move uniformly from the input end 16 to the output conduit 92. A horizontal baffle 93 is mounted on the end wall 94 of tank 11 and extends from wall to wall of the tank. The baffle 93 is parallel to the bottom 96 of the tank 11 and terminates at a point (as illustrated in FIGURE 8) just beyond the entrance of the conduit 91 to the tank 11. Baffle 93 is used to turn the entering oil so that it flows parallel to the bottom 96 of the tank. This insures a uniform oil flow from the input end of the tank to the output conduit 92.

As might be expected, baffle 93 which is submerged below the oil level in the tank, will cause some oil turbulence as a result of changing the oil flow by ninety degrees as illustrated by the flow arrow 97 in FIGURE 8 of the drawings. Therefore to prevent bits of food product from being captured below the baffle 93, a screen 98 is mounted between the leading edge 99 and the bottom 96 of the tank 11. This screen 98 forms an acute angle with the tank bottom 96 and also tends to equalize and uniformly distribute the oil flow.

Figure 5:
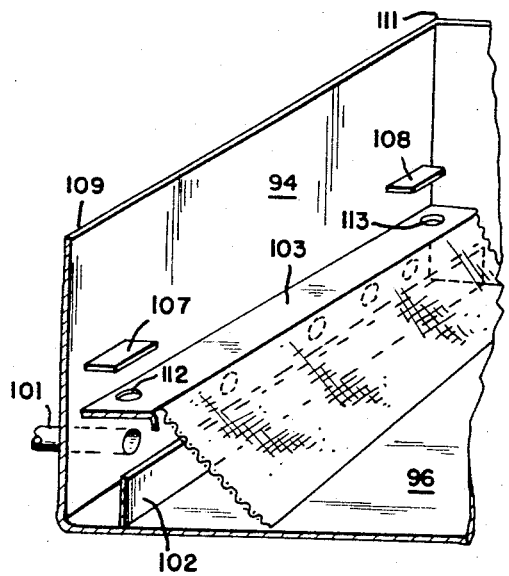
FIGURE 5 is a fractional isometric view of an oil inlet mechanism.
Figure 6:
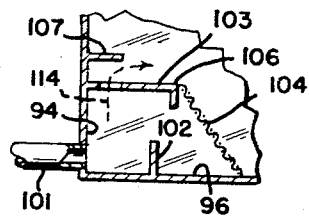
FIGURE 6 is an enlarged view of an oil inlet mechanism, showing the oil flow path.

An alternate embodiment of the previously described mechanism for introducing oil into the tank 11 is illustrated in FIGURES 1, 5, and 6 of the drawings. In FIGURE 1 the oil is introduced through a series of conduits 101 mounted in the end wall 94 of the tank below a horizontal baffle 103 mounted on wall 91 extending from wall to wall of the tank as also illustrated in FIGURE 6 in a manner somewhat similar to the previously described mechanism. In this case, the oil is introduced through conduits 101 parallel to the bottom 96 of the tank 11. This type of oil introduction into a tank also creates eddy currents. Therefore, a baffle 102 is mounted along the bottom 96 of the tank 11 and extends vertically from the bottom of the tank and parallel to the end wall 94 of the tank extends parallel to wall 94 to a point just above the place at which the conduits 101 enter the tank 11. This baffle 102 interrupts the parallel flow of the oil as illustrated in FIGURE 6 of the drawings to insure distribution of the oil throughout the width of the tank. The horizontal baffle 103 is mounted on the end wall 94 of the tank and extends from side to side of the tank 11. Baffle 103 serves the same function as baffle 93 previously described and terminates parallel to the bottom 96 of tank 11 at a point just beyond baffle 102. Baffle 103 intercepts the upward flow of the oil from baffle 102 and again forces the oil to flow parallel to the bottom 96 of the tank. It has been found that these cooperating baffles 102 and 103 tend to produce a very uniform flow of oil from end to end of the tank with a minimum of eddy currents.

As with the previously described apparatus, a screen 104 is mounted at the leading edge 106 of baffle 103 and extends from wall to wall of the tank 11 along baffle edge 106. The screen 104 is fastened to the bottom 96 of the tank 11 and forms an angle with the bottom of the tank as illustrated in FIGURES 6 and 7 of the drawings. Again this screen 104 serves exactly the same function as screen 98 in the previously described example.

A slight modification of this latter oil flow arrangement is illustrated in FIGURE 5 and FIGURE 6 in which corner baffles 107 and 108 are mounted in the corners 109 and 111 respectively, of the tank 11. These baffles are mounted directly above apertures 112 and 113 respectively through which oil flows from beneath baffle 103. Oil flow from the corners 109 and 111 of the tank 11 prevents entrapment of product in the corners of the tank 11. The flow path of the oil in a system utilizing baffles 107 and 108 is illustrated in FIGURE 6 of the drawing where it will be observed that oil flows in the path indicated by dotted arrow 114. It will be observed that the baffles 107 and 108 turn the vertical flow of oil to force it to move horizontally to the bottom 96 of the tank 11 thus again encouraging uniform flow of hot frying oil from the input of the tank 11 to the output conduit 92.

Therefore it will be seen that the present invention provides an efficient, continuous deep fat fryer which is easily adapted to a wide variety of products, efficient in operation, easily maintained, and capable of producing deep fat fried products of high quality. It is to be understood that the specific arrangements and specific illustrations of the invention are not to be considered limitations thereon but many changes and modifications may be made by those skilled in the art which fall within the spirit and scope of the invention.

Now, therefore we claim:

1. A deep fat fryer comprising a chassis, a tank for containing frying oil and mounted on said chassis, a conveyor frame with an input and a discharge end and having side walls, an endless conveyor means mounted between said walls and extending from the input end throughout a portion of the length of said frame, discharge means mounted on said frame between said walls at the discharge end of said frame, a plate means mounted on said frame between said walls and between the conveying surfaces of said endless conveyor means, said plate being located closest to the conveying surface of said endles conveyor means which is nearest the bottom of said tank, means for continuously introducing hot frying oil into said tank and for removing said oil from said tank, and mechanical means interconnecting said chassis and said conveyor frame for positioning said frame in the frying oil within said tank and for removing said frame from said tank.

2. A fryer in accordance with claim 1 in which said discharge means is an endless belt conveyor.

3. A fryer in accordance with claim 2 which further includes a paddle means mounted to said frame between said walls at the input end of said frame.

4. A fryer in accordance with claim 3 in which said plate means is perforated and extends substantially the entire length of said endless conveyor means and substantially from wall to wall of said frame.

5. A fryer in accordance with claim 1 in which said endless conveyor means includes a pair of parallel link chains interconnected by push bars at regular intervals along the length of the parallel chains.

6. A deep fat fryer comprising a chassis, a tank having a rectangular cross section throughout the length thereof and taken perpendicular to the length thereof for containing frying oil and mounted on said chassis, said tank having an input end, a conveyor frame with an input and a discharge end and having side walls, an endless conveyor means mounted between said walls and extending from the input end throughout a portion of the length of said frame, discharge means mounted on said frame between said walls at the discharge end of said frame, a plate means mounted on said frame between said walls and between the conveying surfaces of said endless conveyor means, said plate being located closest to the conveying surface of said endless conveyor means which is nearest the bottom of said tank, means including a baffle for continuously introducing hot frying oil at the input end of said tank and for removing said oil from said tank, and mechanical means interconnecting said chassis and said conveyor frame for positioning said frame in the frying oil within said tank and for removing said frame from said tank.

7. A fryer in accordance with claim 6 which inncludes a plurality of oil inlet conduits mounted in the bottom of said tank and at one end thereof to introduce oil into said tank perpendicular to the length of said tank and which further includes a baffle mounted above said conduits and parallel to the bottom of said tank, said baffle extending from one side of said tank to the other side of said tank and terminating parallel to the bottom of said tank at a point slightly beyond the point of entry of said conduits.

8. A fryer in accordance with claim 6 in which includes a plurality of oil inlet conduits mounted in the end wall of said tank and adjacent the bottom of said tank to introduce oil into said tank parallel to the bottom of said tank, a first baffle mounted on the bottom of said tank perpendicular to said bottom and parallel to the end of said tank and terminating parallel to the end of said tank at a point slightly beyond the place of entry of said conduits, a second baffle mounted above said conduits on the end of said tank and parallel to the bottom of said tank, said second baffle extending from one side of said tank to the other side of said tank and terminating at a point beyond said first baffle.

9. A fryer in accordance with claim 8 in which said second baffle has an opening at each end to permit passage of frying oil and which further includes baffles mounted on said end wall above each of said openings to divert the flow of frying oil flowing through said openings.

10. A fryer in accordance with claim 8 which further includes a screen interconnecting the bottom of said tank and said second baffle and extending from side to side of said tank.

References Cited

UNITED STATES PATENTS

| | | | |
|---|---|---|---|
| 1,356,573 | 10/1920 | Wallace | 99—405 |
| 1,518,206 | 12/1924 | Kramer | 99—404 |
| 2,319,561 | 5/1943 | Scharsch | 99—404 |
| 2,546,163 | 3/1951 | McBeth | 99—404 |
| 2,833,204 | 5/1958 | Kipnis | 99—405 |
| 2,926,597 | 3/1960 | Porambo | 99—405 X |

ROBERT W. JENKINS, *Primary Examiner.*

U.S. Cl. X.R.

99—408